United States Patent
Barkley (10) Patent No.: US 6,801,533 B1
(45) Date of Patent: *Oct. 5, 2004

(54) SYSTEM AND METHOD FOR PROXY SIGNALING IN A DIGITAL SUBSCRIBER LINE ACCESS MULTIPLEXER (DSLAM)

(75) Inventor: Mohan Jonathan Barkley, Austin, TX (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,674

(22) Filed: Dec. 9, 1999

(51) Int. Cl.$^7$ .......................... H04L 12/28; H04M 11/00
(52) U.S. Cl. .................... 370/395.2; 370/401; 370/410; 370/420; 370/352; 379/93.14; 379/93.32
(58) Field of Search .............................. 370/352, 353, 370/354, 355, 356, 400, 401, 395.1, 397, 396, 395.2, 395.31, 419, 496, 497, 426, 409, 410, 373, 395.63, 395.6; 379/93.14, 93.28, 93.09, 93.32, 100.14; 375/222

(56) References Cited

U.S. PATENT DOCUMENTS

| | | | | |
|---|---|---|---|---|
| 5,631,903 A | * | 5/1997 | Dianda et al. ............... | 370/401 |
| 5,905,781 A | * | 5/1999 | McHale et al. ........... | 379/93.06 |
| 6,175,576 B1 | * | 1/2001 | Boakye et al. ............... | 370/524 |
| 6,243,384 B1 | * | 6/2001 | Eriksson et al. ............ | 370/395 |
| 6,298,064 B1 | * | 10/2001 | Christie ...................... | 370/410 |
| 6,345,051 B1 | * | 2/2002 | Gupta et al. ................ | 370/395 |
| 6,466,977 B1 | * | 10/2002 | Sitaraman et al. .......... | 709/225 |
| 6,473,430 B2 | * | 10/2002 | Sreedharan et al. ... | 370/395.63 |
| 6,477,595 B1 | * | 11/2002 | Cohen et al. ............ | 379/93.14 |
| 6,490,273 B1 | * | 12/2002 | DeNaap et al. ............. | 370/352 |

OTHER PUBLICATIONS

ADSL Forum System Reference Model, "Technical Report" at Internet <www.adsl.com/adsl_reference_model.html>, Printed Jun. 30, 1999.
ADSL Tutorial, "Twisted Pair Access to the Information Highway" at Internet <www.adsl.com/ads_tutorial.html>, Printed Jun. 30, 1999.
Web Proforum Tutorial:: ATM over ADSL, "Asynchronous Transfer Mode (ATM) over Asymmetric Digital Subscriber Line (ADSL) Tutorial" at Internet <www.webproforum.com/atm_adsl/acronym.html>, Printed Dec. 9, 1999.
Web Proforum Tutorial:: ATM over ADSL, "Asynchronous Transfer Mode (ATM) over Asynchronous Digital Subscriber Line (ADSL): 2. End to End Service Requirements" at Internet <www.webproforum.com/atm_adsl/topic02.html>, Printed Jun. 30, 1999.

(List continued on next page.)

*Primary Examiner*—Hanh Nguyen
(74) *Attorney, Agent, or Firm*—Baker Botts L.L.P.

(57) ABSTRACT

A system and method for for proxy signaling in a digital subscriber line access multiplexer (DSLAM) is disclosed. The method comprises receiving an indication from a customer premesis equipment that the customer premesis equipment requires a switched virtual connection to a public network. The method further includes recognizing that the customer premesis equipment does not have signalling capability. The method further includes negotiating through a proxy signalling agent located on the DSLAM with the public network on behalf of the customer premesis equipment. A switched virtual connection is established between the proxy signalling agent and the public network. A cross connect is established between the switched virtual connection and the customer premesis equipment such that the customer premesis equipment can communicate with the public network through the switched virtual connection.

20 Claims, 4 Drawing Sheets

OTHER PUBLICATIONS

Web Proforum Tutorial:: ATM over ADSL, "Asynchronous Transfer Mode (ATM) over Asynchronous Digital Subscriber Line (ADSL): 3. ADSL–Based Broadband Service Architecture" at Internet <www.webproforum.com/atm_adsl/topic03.html>, Printed Jun. 30, 1999.

Web Proforum Tutorial:: ATM over ADSL, "Asynchronous Transfer Mode (ATM) over Asynchronous Digital Subscriber Line (ADSL): 4. PPP over ATM over ADSL" at Internet <www.webproforum.com/atm_adsl/topic04.html>, Printed Jun. 30, 1999.

Web Proforum Tutorial:: ATM over ADSL, "Asynchronous Transfer Mode (ATM) over Asynchronous Digital Subscriber Line (ADSL): 5. Customer Premise Configurations" at Internet <www.webproforum.com/atm_adsl/topic05.html>, Printed Jun. 30, 1999.

Web Proforum Tutorial:: ATM over ADSL, "Asynchronous Transfer Mode (ATM) over Asynchronous Digital Subscriber Line (ADSL): 6. Static and Dynamic Connections" at Internet <www.webproforum.com/atm_adsl/topic06.html>, Printed Jun. 30, 1999.

Web Proforum Tutorial:: ATM over ADSL, "Asynchronous Transfer Mode (ATM) over Asynchronous Digital Subscriber Line (ADSL): 7. Traffic–Shaping Requirements" at Internet <www.webproforum.com/atm_adsl/topic07.html>, Printed Dec. 9, 1999.

* cited by examiner

SYSTEM AND METHOD FOR PROXY SIGNALING IN A DIGITAL SUBSCRIBER LINE ACCESS MULTIPLEXER (DSLAM)

TECHNICAL FIELD OF THE INVENTION

The present invention relates in general to the field of digital subscriber line (xDSL) communications and, more particularly, to a system and method for proxy signaling in a digital subscriber line access multiplexer (DSLAM).

BACKGROUND OF THE INVENTION

The Public Switched Telephone Network (PSTN) was originally designed for carrying analog voice communication signals. However, users are increasingly using the PSTN to transmit digital data. A typical PSTN network includes numerous central offices. Communication between the central offices can be accomplished through high speed switched digital links. Local loops couple the central offices to the customer premises. The local loops can be analog networks of twisted pair copper wiring. These analog local loops are often referred to as the Plain Old Telephone System (POTS).

The central office typically includes, among other elements, a bandpass filter that can limit the bandwidth of the local loop to approximately 3.3 kHz (between 300 Hz and 3.4 kHz). This is done so that numerous voice-grade local loop lines can be digitized and multiplexed together for transmission between central offices over the switched digital links.

Current computing environments necessitate the need for digital transmission of data. Several services such as leased or switched lines enable such data traffic, but can be prohibitively expensive. Similarly, replacing the telephone infrastructure with a medium that is more conducive to digital traffic can also be prohibitively expensive. Therefore, users desire to use POTS lines to transmit digital data.

Conventional modem technology is one such method of transmitting digital data over POTS lines. This technology attempts to transmit high speed data over POTS lines within the limits of the allocated voice bandwidth, or below 3.4 kHz.

Digital Subscriber Line (xDSL) technology, on the other hand, can apportion the transmission of data over POTS lines into a voice channel and a digital channel. The voice channel can include signals below 4 kHz while the digital channel can include signals above 4 kHz. As such, xDSL can provide a method to increase the bandwidth of the existing telephone network infrastructure.

Furthermore, xDSL technology can allow conventional electronic devices that use the voice channel, and xDSL devices such as transceivers, to couple to the same POTS network. Furthermore, the conventional devices and the xDSL devices can communicate simultaneously over the same wiring, using the respective channels. To accomplish this task, splitters or filters can be used to separate the two channels. Typically, a splitter or filter is placed both at the central office and the customer premises of an xDSL network.

In order to further enable xDSL communication, a central office typically includes a digital subscriber line access multiplexer (DSLAM). The DSLAM includes a modem pool with a plurality of xDSL transceivers (modems). The xDSL modems of the DSLAM communicate with the xDSL modems at the customer premesis over the digital channel.

In order to transmit the xDSL communication from the DSLAM to the public network, a virtual connection (VC) must be established. Conventionally, such connections are established as permanent virtual connections (PVCs) established between the customer premises equipment (CPE) and the public network. Such PVCs are commonly understood in the art, and explained by such specifications as user network interface (UNI) protocol, and network to network interface (NNI) protocols. Typically, several PVCs are established for each modem in the modem pool.

PVCs are disadvantageous, however, because a conventional system employing PVCs must establish PVCs for each modem in the modem pool of the DSLAM whether or not the PVC is currently in use. Opening PVCs to the public network incurs a cost, then, whether or not the PVC is in use.

Switched virtual connections (SVC) are connections established under a conventional protocol. An SVC is established only when necessary for communication between CPE and the public network. An SVC is a "negotiated" connection, meaning the two endpoints of an SVC communicate and negotiate various parameters of the connection. The endpoints of an SVC connection have "signalling" capability if the endpoints are capable of performing this negotiation.

Therefore, for an SVC to be established for DSL communication, the public network and the CPEs in an xDSL network must perform signalling. However, adding such signalling capability into CPE can be expensive, and can drive up the cost of CPE. Additionally, it can be a technical disadvantage that signalling CPE and non-signalling CPE cannot communicate within the same network.

SUMMARY OF THE INVENTION

In accordance with teachings of the present disclosure, a system and method for proxy signaling in a digital subscriber line access multiplexer (DSLAM) are disclosed that provide significant advantages over prior developed DSLAMs.

According to one aspect of the present invention, a method for proxy signalling in a DSLAM comprises receiving an indication from a customer premesis equipment that the customer premesis equipment requires a switched virtual connection to a public network. The method further includes recognizing that the customer premesis equipment does not have signalling capability. The method further includes negotiating through a proxy signalling agent located on the DSLAM with the public network on behalf of the customer premesis equipment. A switched virtual connection is established between the proxy signalling agent and the public network. A cross connect is established between the DSLAM and the customer premesis equipment such that the customer premesis equipment can communicate with the public network through the switched virtual connection.

According to another aspect of the present invention, a system for proxy signaling in a DSLAM comprises a CPE list of customer premesis equipment interfaces that require a signalling proxy. The CPE list is maintained according to UNI (ATM) addresses of the customer premesis equipment interfaces. The system further comprises a proxy service agent communicatively coupled to the CPE list. The proxy service agent is operable to recognize a customer premesis equipment interface that requires a switched virtual connection to communicate with a public network. The proxy service agent is further operable to negotiate a switched virtual connection on behalf of the customer premesis equipment interface.

It is a technical advantage of the present invention that switched virtual connections are possible for xDSL communication between customer premesis equipment and a public network. Additionally, such SVCs are possible without the need for adding signalling capability to the customer premesis equipment.

It is an additional technical advantage that the present invention allows non-signalling CPEs and signalling CPEs to co-exist on the same xDSL network. This allows for greater flexibility in the type of services offered to customers of an xDSL provider.

It is a further technical advantage that xDSL service is more economically provided because of the reduction of permanent virtual connections.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
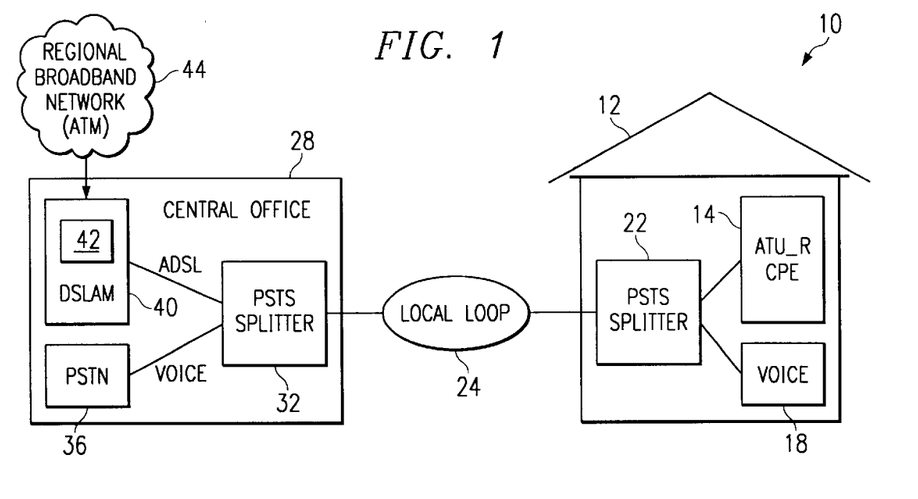
FIG. 1 is a block diagram of an xDSL communication network including one embodiment of a DSLAM having a proxy signaling agent according to the present invention.

FIG. 1 is a block diagram of an xDSL communications network including one embodiment of a DSLAM having a proxy signaling agent. The communications network, indicated generally at 10, includes a customer premises 12. Customer premises 12 can communicate with a central office 28 through a local loop 24. Local loop 24 includes the communication network of the plain old telephone system (POTS). Central office 28 can be, for example, a central office as is typical in the conventional POTS. Local loop 24 typically includes copper wiring between central office 28 and customer premises 12; however, the present invention contemplates that local loop 24 can include any other communications network such as fiberoptic cable. Central office 28 is further in communication with public network 44. Public network 44 can comprise, for example, a regional broadband network.

Customer premises 12 includes customer premises equipment (CPE) 14. CPE 14 is capable of xDSL communication. For example, in the embodiment in FIG. 1, CPE 14 includes an ADSL transfer unit (also known as ATU-R). Customer premises 12 further includes voice equipment 18 and a POTS splitter 22. Voice equipment 18 can include, for example, conventional telephones, facsimile machines, and conventional modem equipment that communicate using the voice channel. CPE 14 and voice equipment 18 are coupled to POTS splitter 22. POTS splitter 22 is further coupled to local loop 24. POTS splitter 22 is operable to separate communications over local loop 24 into a voice channel and a digital channel. As described above, xDSL communications take place over the higher frequency voice channel. POTS splitter 22 can comprise, for example, a low-pass filter.

Central office 28 includes POTS splitter 32 coupled to local loop 24. POTS splitter 32 is also operable to separate communication over local loop 24 into voice channel communications and digital channel communications. Communication over the voice channel is directed to public switched telephone network (PSTN) equipment 36. Communication over the digital channel, such as xDSL communication, is directed to a digital subscriber line access multiplexer (DSLAM) 40. DSLAM 40, in turn, directs xDSL communication to public network 44. In the embodiment of FIG. 1, communication over public network 44 uses asynchronous transfer mode (ATM) protocol. In the embodiment of FIG. 1, DSLAM 40 includes proxy signaling agent (PSA) 42.

In operation, communications network 10 can provide xDSL communications over the conventional POTS system. Such communication can take place simultaneously in the xDSL band frequency while conventional communication takes place over the voice band frequency. Communication network 10 accomplishes this through the use of POTS splitters 32 and 22 as well as using the protocols and other mechanisms conventionally known. For example, an the ADSL forum sets standards and protocol for for ADSL communications.

Voice equipment 18 of customer premises 12 communicates over the voice band to central office 28 via local loop 24. POTS splitter 32 separates voice band communication and directs it to public PSTN equipment 36.

Communications network 10 further allows for xDSL communications. For example, CPE 14, such as an ADSL modem, communicates over the digital channel via local loop 24 with central office 28. POTS splitter 32 directs the communication towards DSLAM 40. In turn, DSLAM 40 transfers this communication to the public network 44 using ATM protocol.

DSLAM 40 of FIG. 1 further includes PSA 42. PSA 42 is operable to provide signaling capability for CPE equipment 14. The signaling capability allows for the provision of a switched virtual connection (SVC) between public network 44 and CPE 14. PSA 42 can provide signaling for ingoing and outgoing communications to and from CPE 14. As such, public network 44 will view CPE 14 as supporting SVC even though CPE 14 does not actually contain signalling capability necessary to support SVC.

It is a technical advantage of the present invention that switched virtual connections are possible for xDSL communication between customer premesis equipment and a public network. Additionally, such SVCs are possible without the need for adding signalling capability to the customer premesis equipment.

It is an additional technical advantage that the present invention allows non-signalling CPEs and signalling CPEs to co-exist on the same xDSL network. This allows for greater flexibility in the type of services offered to customers of an xDSL provider.

It is a further technical advantage that xDSL service is more economically provided because of the reduction of permanent virtual connections on the network side.

Figure 2:
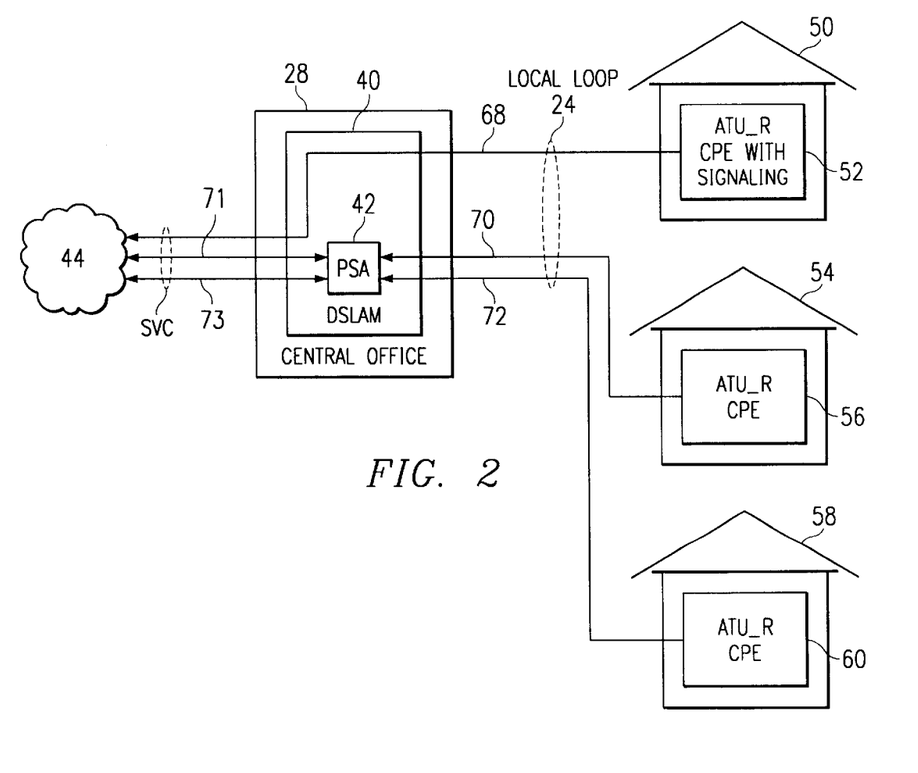
FIG. 2 is a block diagram of an xDSL communication network showing virtual connections, the network including one embodiment of a DSLAM having a proxy signaling agent.

FIG. 2 is a block diagram of an xDSL communication network showing virtual connections, the network including one embodiment of a DSLAM having a proxy signaling agent. Communications network 10 includes customer premises 50, 54, and 58, each in communication with central office 28 through local loop 24 as depicted in FIG. 1. Central office 28 includes DSLAM 40 having a PSA 42. DSLAM 40 transfers communications from customer premises 50, 54, and 58 to public network 44.

The embodiment of FIG. 2 shows the virtual connections (VCs) between customer premises 50, 54, 58 and public network 44. Customer premises 50 includes CPE equipment 52 with signaling capability. Customer premises 54 and 58 includes CPE equipment 56 and 60 that do not have signaling capability.

In operation, CPE 52, since it includes signaling capability, can open an SVC 68 with public network 44. CPE equipment 56 and 60, however, cannot open SVC communications with public network because they do not include signaling capability. Therefore, CPE equipment 56 and 60 can communicate with PSA 42 in DSLAM 40. PSA 42 recognizes CPE 56 and 60 do not include signaling capability. PSA 42 then opens the SVCs 71 and 73 as a proxy for CPE equipment 56 and 60. For example, PSA 42 can use the protocols as specified in user network interface (UNI) and the network to network interface (NNI) to perform such proxy signaling. PSA 42 then establishes cross-connects such that CPEs 56 and 54 can communicate with public network 44 through switched virtual connections.

Figure 3:
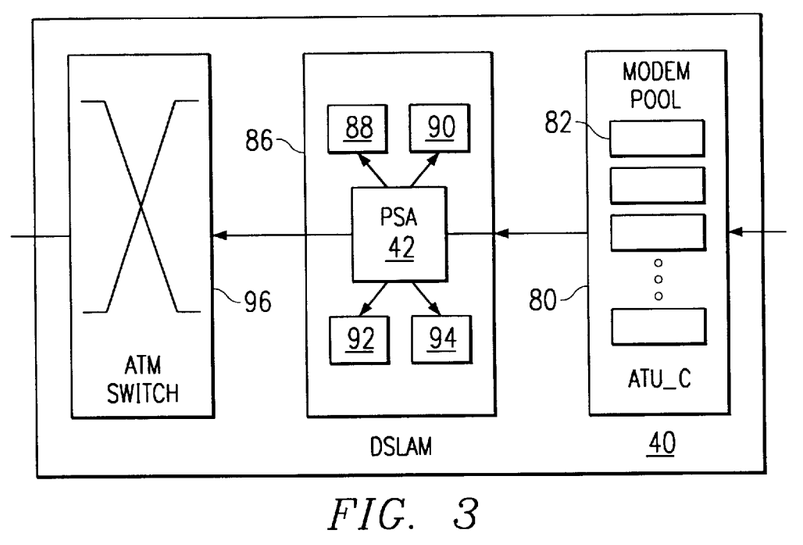
FIG. 3 is a block diagram of one embodiment of a DSLAM having a proxy signaling agent.

FIG. 3 is a block diagram of one embodiment of a DSLAM having a proxy signaling agent. DSLAM 40 includes modem pool 80 communicatively coupled to a PSA 42 which is communicatively coupled to an ATM switch 96. Modem pool 80 includes ADSL modems 82, also known as ADSL transfer units or ATU-Cs. For example, modem pool 80 can include up to 128 or more such ADSL modems 82.

PSA 42 can comprise software running on any card, for example a network interface cared, within DSLAM 40 that can communicate with CPE (see FIG. 1). Alternatively, PSA 42 can be implemented in firmware. PSA 42 is communicatively coupled to a CPE list 88, a UNI map 90, a signaling map 92 and a communications map 94.

In operation, ADSL communications from CPE enters DSLAM 40 via ADSL modems 82 on modem pool 80. The ADSL communication is then transferred to or received by PSA 42. PSA 42 recognizes if the ADSL communication originates from a CPE that requires proxy signaling. For example, PSA can compare addressing information in the ADSL communication with CPE list 86. If the CPE is one in which requires PSA to perform signaling, PSA can use UNI map 90 to relate UNI mapping to virtual private channel interface (VPCI), which is the addressing mode for ATM, for each user network interface (UNI). PSA 42 uses such UNI map 90 to map addressing information from the CPE to the ATM addressing of the public network. PSA 42 uses communications map 92 for virtual private interface/virtual channel interface (VPI/VCI) combinations on which a particular CPE will be communicating. VPI/VCI combinations are an addressing method for SVC. PSA 42 uses signaling map 94 to provide signaling map 94 to provide signaling and ILMI VPI/VCI for each UNI per CPE. The creation of CPE list 88, UNI map 90, communication map 92 and signaling map 94 can be created dynamically or hard coded into network interface card 86.

Figure 4:
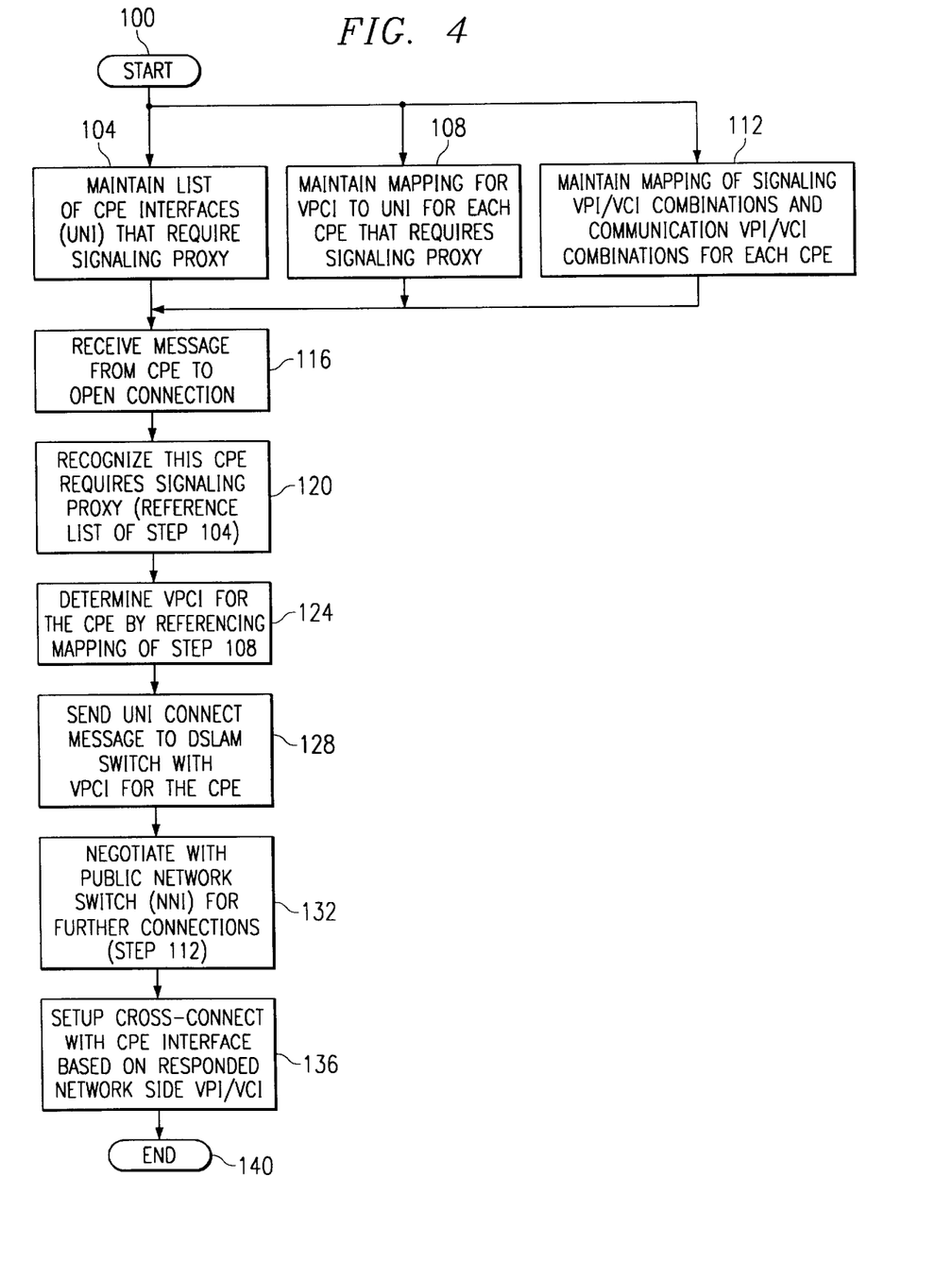
FIG. 4 is a flow diagram of one embodiment of a method for using proxy signaling in an outbound communications call.

FIG. 4 is a flow diagram of one embodiment of a method for using proxy signaling for outbound communication. Referring back to FIGS. 1–3, outbound communications refers to communication begun at the CPE and traveling to the public network 44. The method of FIG. 4 starts at step 100. At steps 104, 108, 112, mapping is maintained to allow for the proxy signaling. At step 104, a list is maintained of CPE interfaces (UNI) that requires a signaling proxy. In step 108, a mapping is maintained for VPCI to UNI addressing for each CPE that requires a signaling proxy. At step 112 mapping is maintained of signaling VPI/VCI combinations and ILMI VPI/VCI combinations for each CPE that requires a signaling proxy.

At step 116, a message is received from a CPE that indicates the CPE requires an SVC to a public network. For example, a message could be received over a predefined PVC between the DSLAM and the CPE. At step 120, it is recognized that the CPE requesting SVC communication requires a signaling proxy. For example, the agent operating the method of FIG. 4 could reference the list maintained at step 104 to recognize the UNI address of this particular CPE.

At step 124 the VPCI is determined for the CPE requesting SVC. For example, the VPCI addressing could be recognized by referencing the mapping maintained at step 108.

At step 128, a UNI connect message is sent with the correct VPCI addressing. Such UNI connect messages can be sent for example to an ATM switch within a DSLAM that provides a connnection to the public network.

At step 132, a negotiation is performed with the public network switch (using NNI) on behalf of the CPE that requires such a proxy. An SVC is established and at step 136 a cross connect is established between the network and the ATM switch within the DSLAM such that the CPE can communicate with the public network through the SVC. Such a negotiation is explained for example in NNI specifications, UNI specifications, and SVC specifications, and it is contemplated that one skilled in the art will recognize such provisions. Negotiation takes place over the signaling VPI/VCI addresses maintained for each CPE in step 112.

At step 136, a cross-connect is set up between the SVC and the CPE interface based upon the network VPI/VCI addresses obtained through negotiation at step 132.

Figure 5:
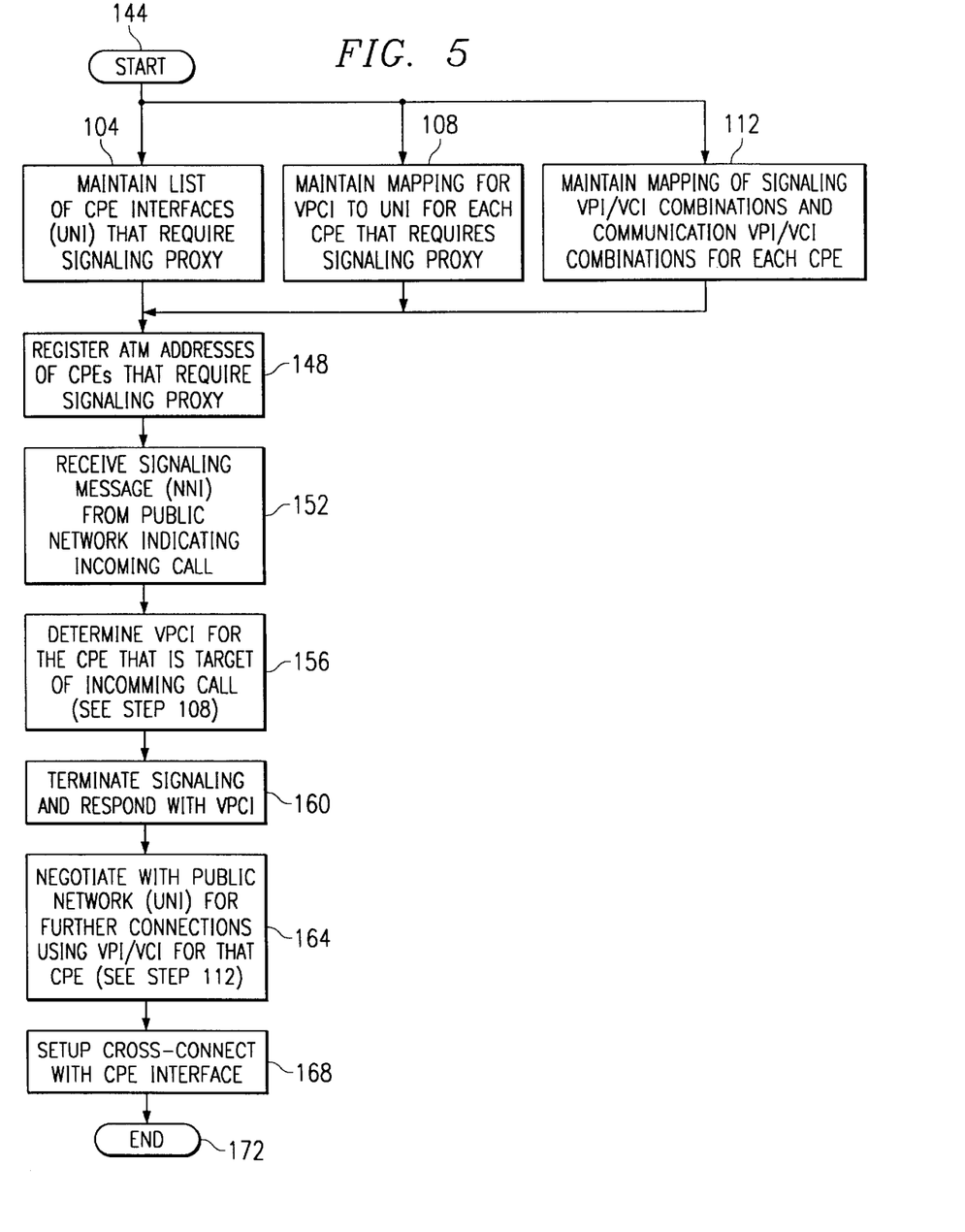
FIG. 5 is a flow diagram of one embodiment of a method for using proxy signaling in an inbound communications call.

FIG. 5 is a flow diagram of one embodiment of a method of using proxy signaling for inbound communications. The method of FIG. 5 is performed for example by a PSA agent as described with respect to FIGS. 1–3. For the purposes of the present embodiment, inbound communications refers to communications begun by the public network and traveling towards CPE equipment. The method begins with step 144. At steps 104, 108, and 112, mapping is maintained similar to the mapping as described with respect to FIG. 4.

In step 148, the PSA agent registers ATM addresses of CPEs that require signaling proxy. For example, such registration can be performed at the ATM switch of the DSLAM in which the PSA is operating. Such registration allows the ATM switch to recognize when it receives a request for communication with a CPE that does not have signalling capability. In step 152 a signaling message is received from the public network indicating an incoming call. For example, such signaling includes a request for a SVC to be set up between the public network and a CPE. Such receipt of a signaling message would occur if the ATM switch of the DSLAM in which the PSA is operating recognizes that the ATM address the intended recipient of an incoming call is a CPE upon which the PSA has registered its ATM address by step 148.

In step 156 the PSA determines the VPCI for the CPE that is target of the incoming call. For example, the agent makes such a determination from the mapping maintained by step 108. At step 160, the PSA terminates signaling and responds with the VPCI that was determined by step 156. At step 164 the PSA negotiates with the public network (NNI) for further connections using the VPI/VCI for that CPE. For example, the PSA can determine the correct VPI/VCI addressing using the mapping as maintained by step 112. As this step 164 of the PSA performs all signaling required to open a SVC with the public network. By performing such signaling for the CPE, the CPE does not require signaling capability.

At step 168, the PSA sets up the cross connect with the CPE interface. That is, after negotiating for the proper VPI/VCI addressing for the SVC, the PSA can set up the cross connects with the CPE interface of the CPE to which the incoming call is intended. The method ends at step 172.

Figure 6:
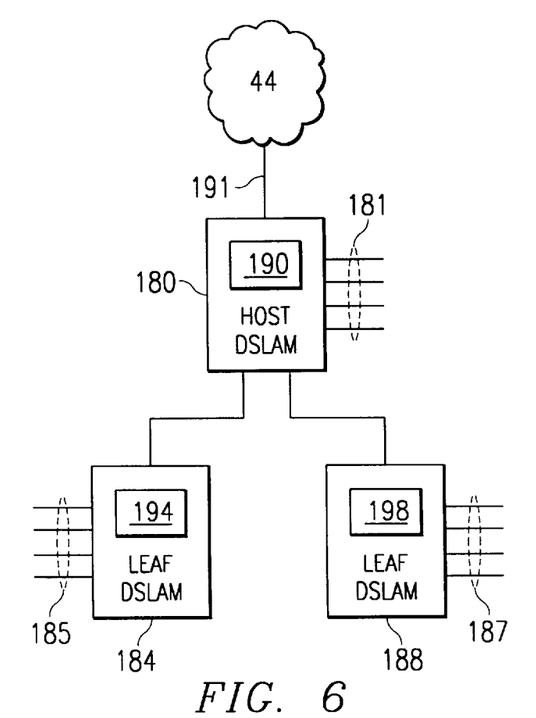
FIG. 6 is a block diagram of one embodiment of subtended DSLAMs having proxy signaling agents.

FIG. 6 is a block diagram of a subtended DSLAMs id having proxy signaling agents. The embodiment of FIG. 6 includes host DSLAM 180 coupled to leaf DSLAM 184 and leaf DSLAM 188. Host DSLAM 180 includes network port 191 with access to public network 44. The configuration of FIG. 6, known as a "subtended" configuration, allows host DSLAM and leaf DSLAMs 184 and 188 to access public network 44 through a single network port 191.

Host DSLAM 180 includes modem pool 181 for communication with CPEs similar to DSLAM 40 of FIG. 1. Likewise, leaf DSLAM 184 includes modem pool 185 and leaf DSLAM 188 includes modem pool 187. Subtending allows for an increase in the number of CPEs with access to public network 44 through a single network port 191.

Host DSLAM 180 further includes PSA agent 190. Leaf DSLAM 184 includes PSA agent 184, and leaf DSLAM 188 includes PSA agent 198. If the public network 44 can handle multiple signaling virtual channels, then in the embodiment as shown in FIG. 6, PSA agent 194 and 198 can communicate through host DSLAM 180 with public network 44. As such, PSA 194 and 198 can perform proxy signaling for CPEs coupled to leaf DSLAMS 184 and 188. Such an embodiment is preferable because no private network interface (PNI routing) will be necessary between host DSLAM 180 and leaf DSLAMs 184 and 188.

However, it is possible that public network 144 does not support multiple signaling for virtual channels. In such an embodiment, leaf DSLAM 184 and leaf DSLAM 188 will have to perform network interface (NNI) signaling through the host DSLAM 180.

Although the disclosed embodiments have been described in detail, it should be understood that various changes, substitutions and alterations can be made to the embodiments without departing from their spirit and scope.

What is claimed is:

1. A method for proxy signaling in a digital subscriber line access multiplexer (DSLAM), the DSLAM providing a gateway between a public network and customer premises equipment for digital subscriber line communications, the method comprising:

receiving an indication from a customer premises equipment that the customer premises equipment requires a switched virtual connection to a public network;

recognizing that the customer premises equipment does not have signaling capability by referencing a list of customer premises equipment that does not have signaling capability;

negotiating through a proxy signaling agent located on the DSLAM with the public network on behalf of the customer premises equipment using VPI/VCI addressing combinations from a signaling map stored by a network interface card, the network interface card communicatively coupled to the customer premises equipment;

establishing a switched virtual connection between the DSLAM and the public network; and establishing a cross connect between the DSLAM and the customer premises equipment such that the customer premises equipment can communicate with the public network through the switched virtual connection using VPI/VCI addressing combinations from a communications map stored by the network interface card.

2. The method of claim 1 further comprising maintaining a CPE list of customer premises equipment interfaces that require a signaling proxy, the list maintained according to UNI addresses of the customer premises equipment interfaces, and wherein the list of customer premises equipment comprises the CPE list.

3. The method of claim 1, further comprising:

maintaining a UNI map that correlates VPCI addressing to UNI addressing for customer premises equipment interfaces that require a signaling proxy;

maintaining a signaling map that includes VPI/VCI addressing combinations for the proxy signaling agent to use for negotiating with the public network for customer premises equipment interfaces that require a signaling proxy; and maintaining a communications map that includes VPI/VCI addressing combinations that the customer premises equipment will use for communication with the public network.

4. The method of claim 3, wherein the negotiating step takes place over the VPI/VCI addresses included in the signaling map.

5. The method of claim 3, wherein the establishing step uses the VPI/VCI addresses included in the communications map.

6. A system for proxy signaling in a digital subscriber line access multiplexer (DSLAM), the DSLAM providing a gateway between a public network and customer premises equipment for digital subscriber line communications, the system comprising:

a CPE list of customer premises equipment interfaces that do not have signaling capabilities, the list maintained according to UNI addresses of the customer premises equipment interfaces; and a proxy service agent communicatively coupled to the CPE list, operable to recognize, by referencing the CPE list, a customer premises equipment interface that requires a switched virtual connection to communicate with the public network and that does not have signaling capabilities, the proxy service agent further operable to negotiate a switched virtual connection on behalf of the customer premises equipment interface using a signaling map;

a network interface card, coupled to the proxy service agent;

the signaling map stored by the network interface card, the signaling map including VPI/VCI addressing combinations used to negotiate with the public network; and a communications map stored by the network interface card, the communications map including VPI/VCI addressing combinations to be used by the customer premises equipment in communicating with the public network.

7. The system of claim 6, further comprising a UNI map to which the proxy service agent is communicatively coupled, wherein the UNI map correlates VPCI addressing to UNI addressing for customer premises equipment interfaces that require a signaling proxy.

8. The system of claim 6, wherein the UNI list comprises data stored on a computer readable medium.

9. The system of claim 6, wherein the proxy service agent comprises executable code stored upon a computer readable medium.

10. An apparatus for use as a digital subscriber line access multiplexer comprising:

a modem pool;

a network interface card communicatively coupled to the modem pool;

a proxy service agent stored upon the network interface card, the proxy service agent operable to recognize, by referencing a list of customer premises equipment interfaces, a customer premises equipment interface that requires a switched virtual connection to communicate with a public network and that does not have signaling capability, the proxy service agent further operable to negotiate a switched virtual connection on behalf of the customer premises equipment interface;

a signaling map stored by the network interface card and to which the proxy service agent is communicatively coupled, the signaling map including VPI/VCI addressing combinations for negotiating with the public network for customer premises equipment interfaces that require a signaling proxy; and a communications map stored by the network interface card and to which the proxy service agent is communicatively coupled, the communications map including VPI/VCI addressing combinations that the customer premises equipment will use for communication with the public network.

11. The apparatus of claim 10 further comprising a CPE list stored upon the network interface card and to which the proxy service agent is communicatively coupled, the CPE list including customer premises equipment interfaces that require a signaling proxy, the list maintained according to UNI addresses of the customer premises equipment interfaces, and wherein the list of customer premises equipment interfaces comprises the CPE list.

12. The apparatus of claim 11, further comprising a UNI map stored upon the network interface card and to which the proxy service agent is communicatively coupled, wherein the UNI map correlates VPCI addressing to UNI addressing for customer premises equipment interfaces that require a signaling proxy.

13. The apparatus of claim 10 further comprising an ATM switch communicatively coupled to the network interface card.

14. A computer program stored on a computer readable medium, the computer program operable to:

receive an indication from a customer premises equipment that the customer premises equipment requires a switched virtual connection to a public network;

recognize that the customer premises equipment does not have signaling capability by referencing a list of customer premises equipment that do not have signaling capability;

negotiate through a proxy signaling agent located on "a digital subscriber line access multiplex (DSLAM) " with the public network on behalf of the customer premises equipment using VPI/VCI addressing combinations from a signaling map stored by a network interface card, the network interface card communicatively coupled to the customer premises equipment;

establish a switched virtual connection between the DSLAM and the public network; and establish a cross connect between the DSLAM and the customer premises equipment such that the customer premises equipment can communicate with the public network through the switched virtual connection using VPI/VCI addressing combinations from a communications map stored by the network interface card.

15. The computer program of claim 14, further operable to maintain a CPE list of customer premises equipment interfaces that do not have signaling capability, the list maintained according to UNI addresses of the customer premises equipment interfaces, and wherein the list of customer premises equipment comprises the CPE list.

16. The computer program of claim 14, further operable to:

maintain a UNI map that correlates VPCI addressing to UNI addressing for customer premises equipment interfaces that require a signaling proxy;

maintain a signaling map that includes VPI/VCI addressing combinations for the proxy signaling agent to use for negotiating with the public network for customer premises equipment interfaces that require a signaling proxy; and maintain a communications map that includes VPI/VCI addressing combinations that the customer premises equipment will use for communication with the public network.

17. The computer program of claim 16, wherein the computer program is further operable to negotiate through the proxy signaling agent by using the VPI/VCI addresses included in the signaling map.

18. The computer program of claim 16, wherein the computer program is further operable to establish the switched virtual connection using the VPI/VCI addresses included in the communications map.

19. A system for proxy signaling comprising:

means for receiving an indication from a customer premises equipment that the customer premises equipment requires a switched virtual connection to a public network;

means for recognizing, by referencing a list of customer premises equipment that do not have signaling capability, that the customer premises equipment does not have signaling capability;

means for negotiating through a proxy signaling agent located on "a digital subscriber line access multiplex (DSLAM) " with the public network on behalf of the customer premises equipment using VPI/VCI addressing combinations from a signaling map stored by a network interface card, the network interface card communicatively coupled to the customer premises equipment;

means for establishing a switched virtual connection between the DSLAM and the public network;

means for establishing a cross connect between the DSLAM and the customer premises equipment such that the customer premises equipment can communicate with the public network through the switched virtual connection using VPI/VCI addressing combinations from a communications may stored by the network interface card; and means for maintaining a CPE list of customer premises equipment interfaces that require a signaling proxy, the list maintained according to UNI addresses of the customer premises equipment interfaces.

20. An apparatus for use as a digital subscriber line access multiplexer comprising:

a modem pool;

a network interface card communicatively coupled to the modem pool;

a proxy service agent stored upon the network interface card, the proxy service agent operable to recognize, a customer premises equipment interface that requires a switched virtual connection to communicate with a public network, the proxy service agent further operable to negotiate a switched virtual connection on behalf of the customer premises equipment interface;

a CPE list stored upon the network interface card and to which the proxy service agent is communicatively coupled, the CPE list including customer premises equipment interfaces that require a signaling proxy, the list maintained according to UNI addresses of the customer premises equipment interfaces;

a UNI map stored upon the network interface card and to which the proxy service agent is communicatively coupled, wherein the UNI map correlates VPCI addressing to UNI addressing for customer premises equipment interfaces that require a signaling proxy;

a signaling map stored upon the network interface card and to which the proxy service agent is communicatively coupled, the signaling map including VPI/VCI addressing combinations for negotiating with the public network for customer premises equipment interfaces that require a signaling proxy; and a communications map stored upon the network interface card and to which the proxy service agent is communicatively coupled, the communications map including VPI/VCI addressing combinations that the customer premises equipment will use for communication with the public network.

* * * * *

UNITED STATES PATENT AND TRADEMARK OFFICE
CERTIFICATE OF CORRECTION

PATENT NO. : 6,801,533 B1
DATED : October 5, 2004
INVENTOR(S) : Barkley

It is certified that error appears in the above-identified patent and that said Letters Patent is hereby corrected as shown below:

Title page,
Item [57], ABSTRACT,
Line 1, delete first occurrence of "for".

Column 9,
Line 37, after "on" delete " " ".
Line 38, after "(DSLAM)", delete " " ".

Column 10,
Line 23, after "on" delete " " ".
Line 24, after "(DSLAM)", delete " " ".
Line 37, after "communications", delete "may", and insert -- map --.

Signed and Sealed this

Eighteenth Day of January, 2005

JON W. DUDAS
*Director of the United States Patent and Trademark Office*